United States Patent [19]

Shioda

[11] Patent Number: 5,385,283
[45] Date of Patent: Jan. 31, 1995

[54] DEVICE ATTACHED TO A STEERING WHEEL FOR SUPPORTING OBJECTS THEREON

[76] Inventor: Yoshihiko Shioda, 4603 South Blvd., Charlotte, N.C. 28209

[21] Appl. No.: 104,669
[22] Filed: Aug. 10, 1993
[51] Int. Cl.⁶ ............................................. B60R 11/00
[52] U.S. Cl. ................................. 224/276; 224/277; 248/447.1
[58] Field of Search .......................... 224/276, 277; 248/447.1, 447.2, 441.1, 451

[56] References Cited

U.S. PATENT DOCUMENTS

| | | |
|---|---|---|
| 1,236,050 | 8/1917 | Caldwell . |
| 1,680,998 | 8/1928 | Krantz . |
| 1,865,241 | 6/1932 | Dock . |
| 1,883,714 | 10/1932 | Gray . |
| 1,977,507 | 10/1934 | Edwards ........................ 224/276 |
| 2,006,169 | 6/1935 | Harris-Jones .................. 248/447.2 |
| 2,150,709 | 3/1939 | Bake ........................ 224/276 X |
| 2,333,353 | 11/1943 | Zanella . |
| 2,514,102 | 7/1950 | Strumbos ........................ 224/276 |
| 2,918,202 | 12/1959 | Constantine et al. . |
| 3,074,745 | 1/1963 | Burckhalter . |
| 3,952,988 | 4/1976 | Easterly . |
| 4,375,881 | 3/1983 | Mitchell . |
| 4,726,607 | 2/1988 | White ........................ 224/276 X |
| 4,995,637 | 2/1991 | Muraishi . |
| 5,193,777 | 3/1993 | Faulstich ........................ 224/276 |

FOREIGN PATENT DOCUMENTS

| | | | |
|---|---|---|---|
| 3701593 | 8/1988 | Germany ........................ 224/276 |
| 379616 | 5/1931 | United Kingdom ........... 224/276 |

*Primary Examiner*—Renee S. Luebke
*Attorney, Agent, or Firm*—Shefte, Pinckney & Sawyer

[57] ABSTRACT

A clipboard attachment for a steering wheel that can be used when the steering wheel is being manipulated. The clipboard attachment has a clipboard and a housing to which the clipboard is attached. The housing securely attaches to the inner rim of the steering wheel. Opposed telescoping securing portions partially enclosed within the housing extend outward and are spring biased to engage the inner rim of the steering wheel. Mating hook and loop fasteners releasably attach U-shaped ends of the securing portions to the steering wheel.

12 Claims, 6 Drawing Sheets

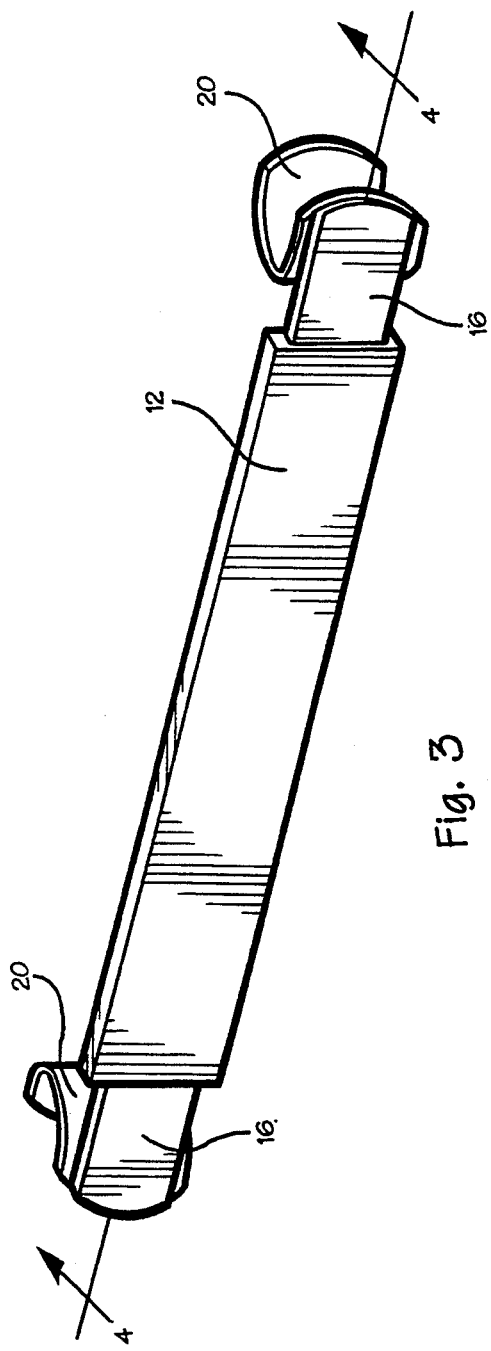
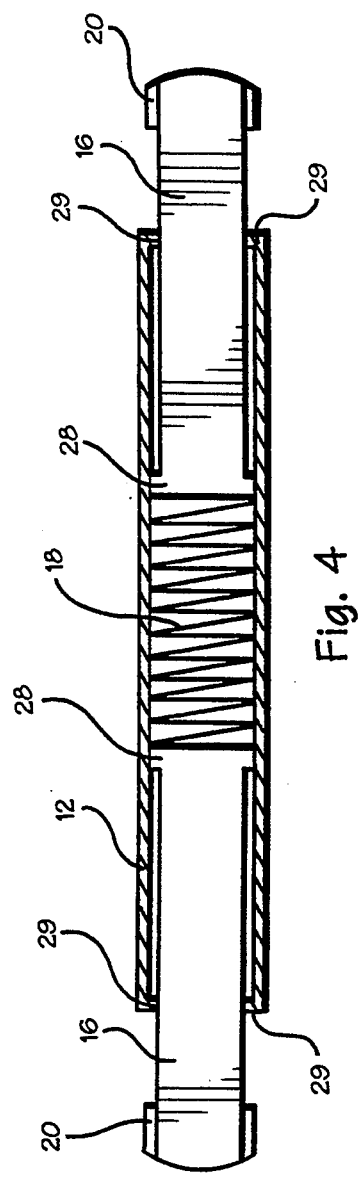
Fig. 3
Fig. 4

DEVICE ATTACHED TO A STEERING WHEEL FOR SUPPORTING OBJECTS THEREON

BACKGROUND OF THE INVENTION

This invention relates to a device attached to a steering wheel for supporting objects thereon, and more particularly, to a clipboard attachment for a steering wheel that can be used when the vehicle is in motion and the steering wheel is being manipulated.

Clipboard attachments for steering wheels are useful as they provide motorists a place to write and a place to clip maps or other papers.

Prior art of clipboard attachments for steering wheels provides motorists with a place to write and a place to clip maps or other papers, but, because of their design, they may only be used when the vehicle is not in motion since they do not maintain attachment to the steering wheel when the vehicle is being driven. There also are prior art clipboard attachments to steering columns and the like which can be used when the vehicle is in motion and the steering wheel is manipulated, since these clipboards are not attached to the steering wheel. However, because these clipboards and the like are not attached to the steering wheel, they are awkwardly located for reading or writing, being away from the immediate vicinity in front of the motorist with the steering wheel interposed between the motorist and the clipboard.

Accordingly, there remains a need for a clipboard attachment that can be used for both writing and reading and that can be used while the vehicle is in motion and the steering wheel is being manipulated.

SUMMARY OF THE INVENTION

Briefly described, the present invention relates to a device attached to a steering wheel for supporting objects thereon, and more particularly, to a clipboard attachment for a steering wheel having a clipboard and a housing to which the clipboard is attached. Moreover, the clipboard attachment of the present invention is an improvement over the prior art, as both the clipboard attachment to the housing and the housing attachment to the steering wheel are independent of the force of gravity. Rather than sit or hang upon the steering wheel and depend upon gravity, the housing of the clipboard attachment of the present invention securely attaches to the inner rim of the steering wheel by way of an affirmatively engaging means, such as, for example, a spring biasing mechanism. In addition, the clipboard is also securely fastened to the housing by, for example, mating hook and loop fasteners. Hence, the present invention may be utilized when the vehicle is in motion and the steering wheel is being manipulated.

More generally, however, the present invention relates to a device having a housing attached to a steering wheel where the housing is securely attached to the inner rim of the steering wheel by way of affirmatively engaging means, such as, for example, a spring biasing mechanism. Concerning a clipboard attachment for a steering wheel, as mentioned above, the present invention broadly relates to the attachment of the housing to the inner rim of the steering wheel without regard for the means of attachment of the clipboard to the housing.

Secure attachment of the housing to the inner rim of the steering wheel is accomplished by use of securing portions located at opposite ends of the housing. The securing portions are preferably formed with outwardly facing U-shaped ends for receiving therein the inner rim of the steering wheel. Furthermore, means may be provided for further securing the securing portions to the inner rim of the steering wheel in conjunction with the above-mentioned engaging means, such as, for example, flexible strips of material secured to the securing portions and having one end releasably engageable with the securing portion by, e.g., mating hook and loop fastener means. Such mating hook and loop fastener means can be fastened around the steering wheel rim to assist engaging attachment of the securing portions to the inner rim of the steering wheel.

With the spring biasing means urging the securing portions outwardly into engagement with the inner rim of the steering wheel, the securing potions are preferably telescoped within the housing to allow retraction of the securing portions for insertion with and removal from the steering wheel, as well as to allow attachment of the housing to various sizes of steering wheels.

As for attachment of the clipboard to the housing, it is contemplated that attachment could be effectuated by conventional use of screws. However, it is also contemplated that the clipboard may be attached to the housing in an easily releasable manner, and furthermore, that the housing may be easily releasably attached, for example, by mating hook and loop fasteners.

In another aspect of the present invention, releasable attachment of the clipboard to the housing may be by use of a downwardly slotted member attached to the clipboard and receiving means for the downwardly slotted member associated with the housing. Attachment would result from inserting the receiving means of the housing into the slotted member of the clipboard. While this would not necessarily keep the clipboard from dislodging when the vehicle is in motion and the wheel is manipulated, the dimensions of the slotted member and the receiving means could be constructed such that the slotted member and the receiving means form a tight fit that would resist dislodging.

Finally, for ease of use of the clipboard attachment when the vehicle is in motion and the wheel is manipulated, it is also contemplated that the clipboard should be disposed within the peripheral confines of the steering wheel.

BRIEF DESCRIPTION OF THE DRAWINGS

FIG. 3 is a perspective view of the housing and the telescoping U-shaped ends of the securing portions of the clipboard attachment of FIG. 1;

FIG. 4 is a vertical sectional view taken along line 4—4 of FIG. 3;

DETAILED DESCRIPTION OF THE PREFERRED EMBODIMENT

Figure 1:
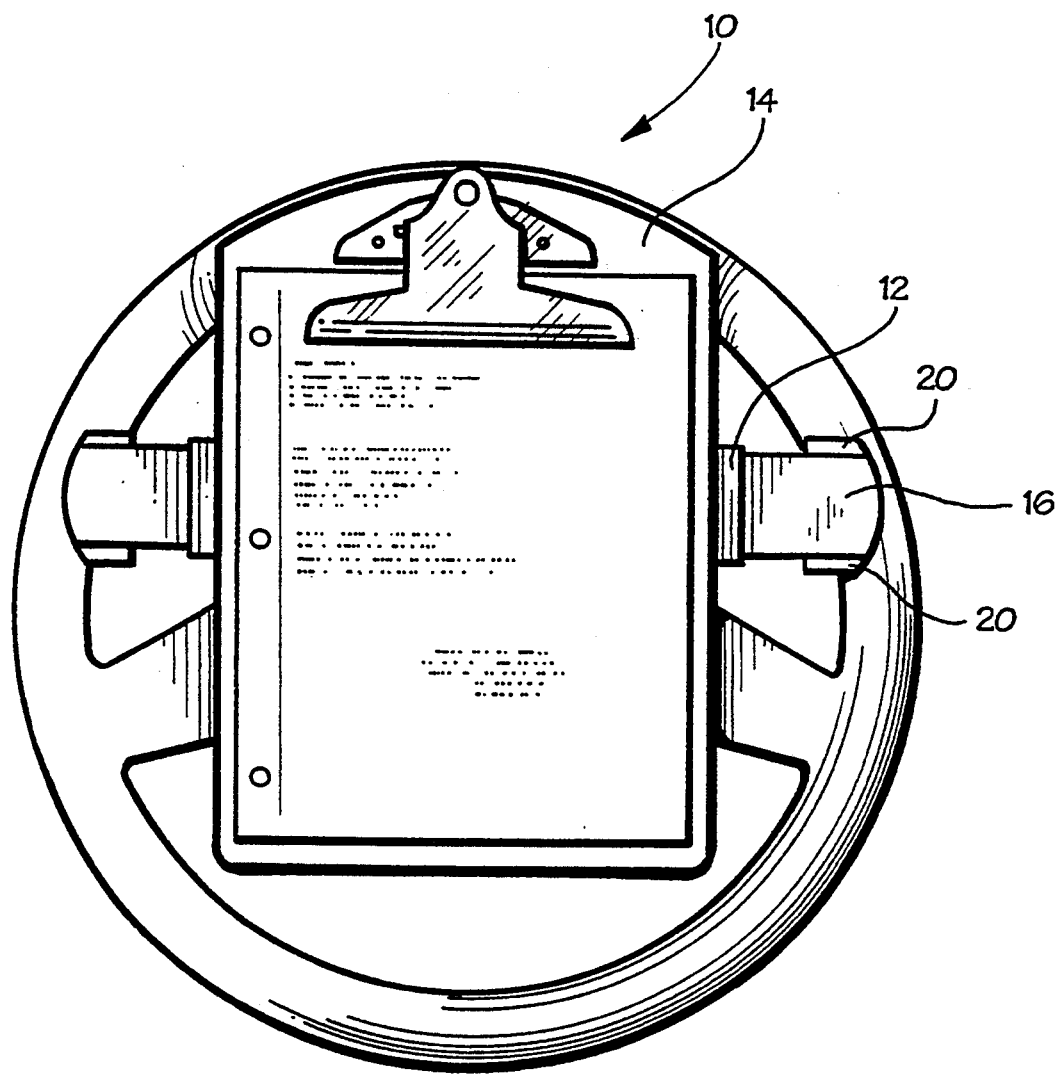
FIG. 1 is a plan view of the preferred embodiment of the clipboard attachment of the present invention showing attachment to a steering wheel.

Referring now to FIGS. 1-4, the clipboard attachment 10 of the preferred embodiment of the present invention generally comprises a housing 12, a clipboard 14, securing portions 16 telescoped within the housing 12, and a coil spring 18 intermediately disposed between the securing portions 16 within the housing 12 for urging the securing portions 16 outward. The securing portions 16 have outwardly facing U-shaped ends 20 for receivingly engaging the inner rim of a steering wheel therein.

The securing portions 16 are formed with shoulders 28 on their inner ends in abutment with the coil spring 18 which applies outward bias to the securing portions 16. The housing 12 has complementary shoulders 29 at the outer ends for engagement of the securing portion shoulders 28 to retain the securing portions 16 in the housing 12.

Figure 2:
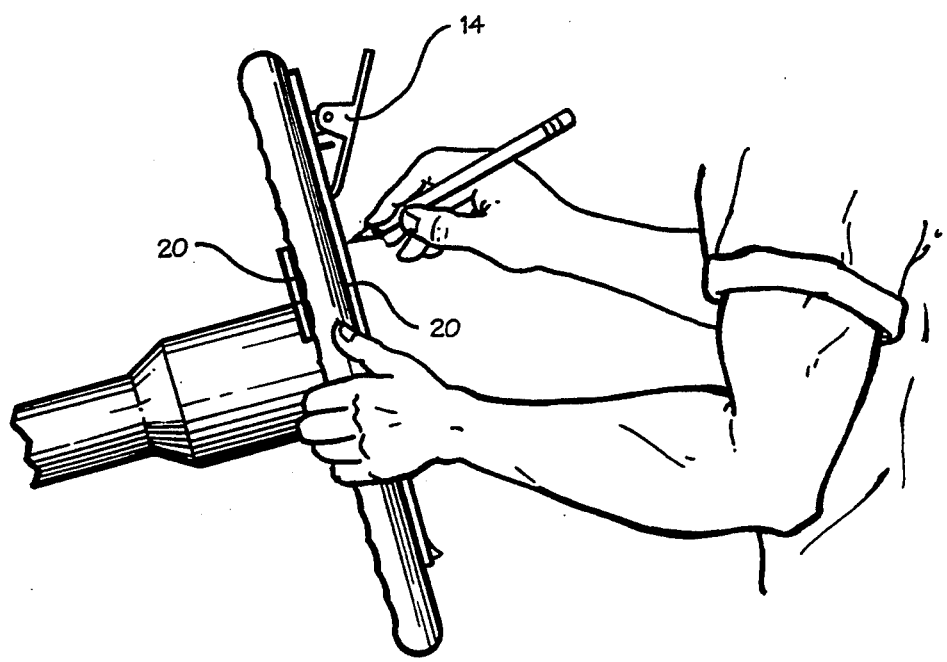
FIG. 2 is a side elevational view of the clipboard attachment of FIG. 1, showing a motorist utilizing the clipboard attachment for writing.

When the securing portions 16 are fully extended outwardly, the distance from one U-shaped end 20 to another U-shaped end 20 of the securing portions 16 exceeds the diameter of a steering wheel to which the housing 12 is to be attached. When the clipboard attachment 10 is placed upon a steering wheel, as illustrated in FIG. 1, the securing portions 16 must be retracted into the housing 12 in order for both U-shaped ends 20 to receive the inner rim of the steering wheel. When released, the compressed spring 18 will urge the U-shaped ends 20 of the securing portions 16 into attachment with the inner rim of the steering wheel. The spring 18 has a sufficient spring constant and is sufficiently displaced so that the housing 12 and clipboard 14 are securely held in place by the urging of the coil spring 18 on the securing portions 16. Furthermore, it is contemplated that the spring force is large enough to reasonably secure the housing 12 and clipboard 14 during use of the clipboard 14, such as when writing as illustrated in FIG. 2.

Figure 5:
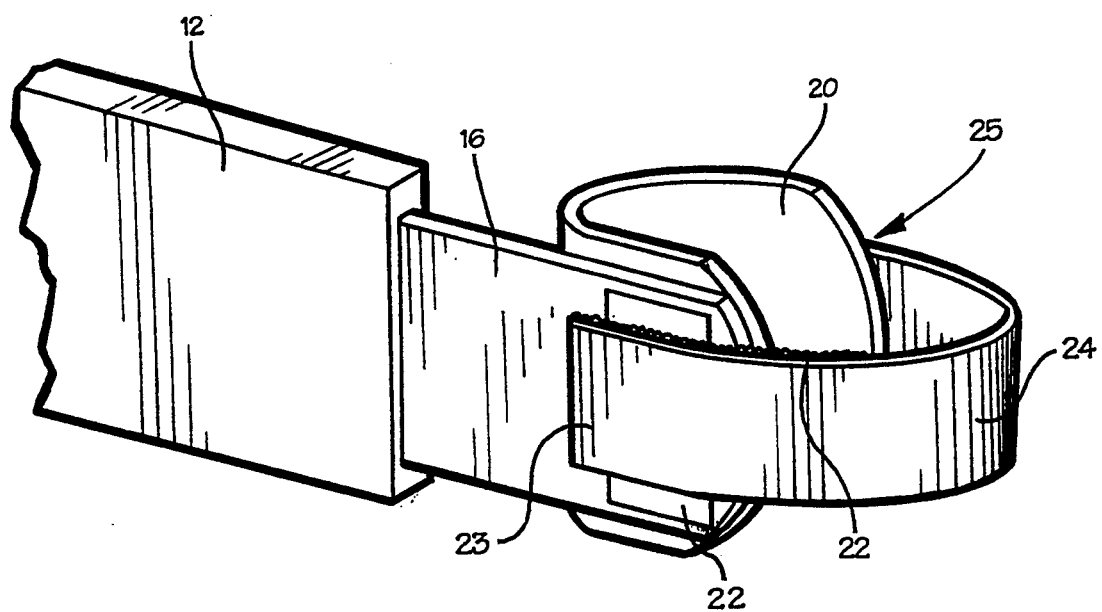
FIG. 5 is a perspective partial view of the right hand end of the housing and securing portion of the clipboard attachment of FIG. 1, showing mating hook and loop fastener means for further securing the U-shaped ends of the securing portions to the inner rim of the steering wheel.

FIG. 5 shows a clipboard attachment 10 of the preferred embodiment consisting further of additional means for engaging attachment of the U-shaped ends 20 of the securing portions 16 to the inner rim of the steering wheel. The means employed is a strip of flexible material 24 having one end 25 permanently secured to one side of a U-shaped end 20 and its other end 23 releasably secured to the other side of the U-shaped end 20. When attached to the steering wheel (not shown), the inner rim of the steering wheel is nested within the U-shaped end 20, and it is then not only secured by the force of the spring 18 urging the securing portions 16 in an outward direction, but also by the wrapping of the flexible strip 24 around the steering wheel rim itself and by the subsequent fastening of the strip 24 to the securing portion 16 by way of the mating hook and loop fastener means 22.

Figure 6:
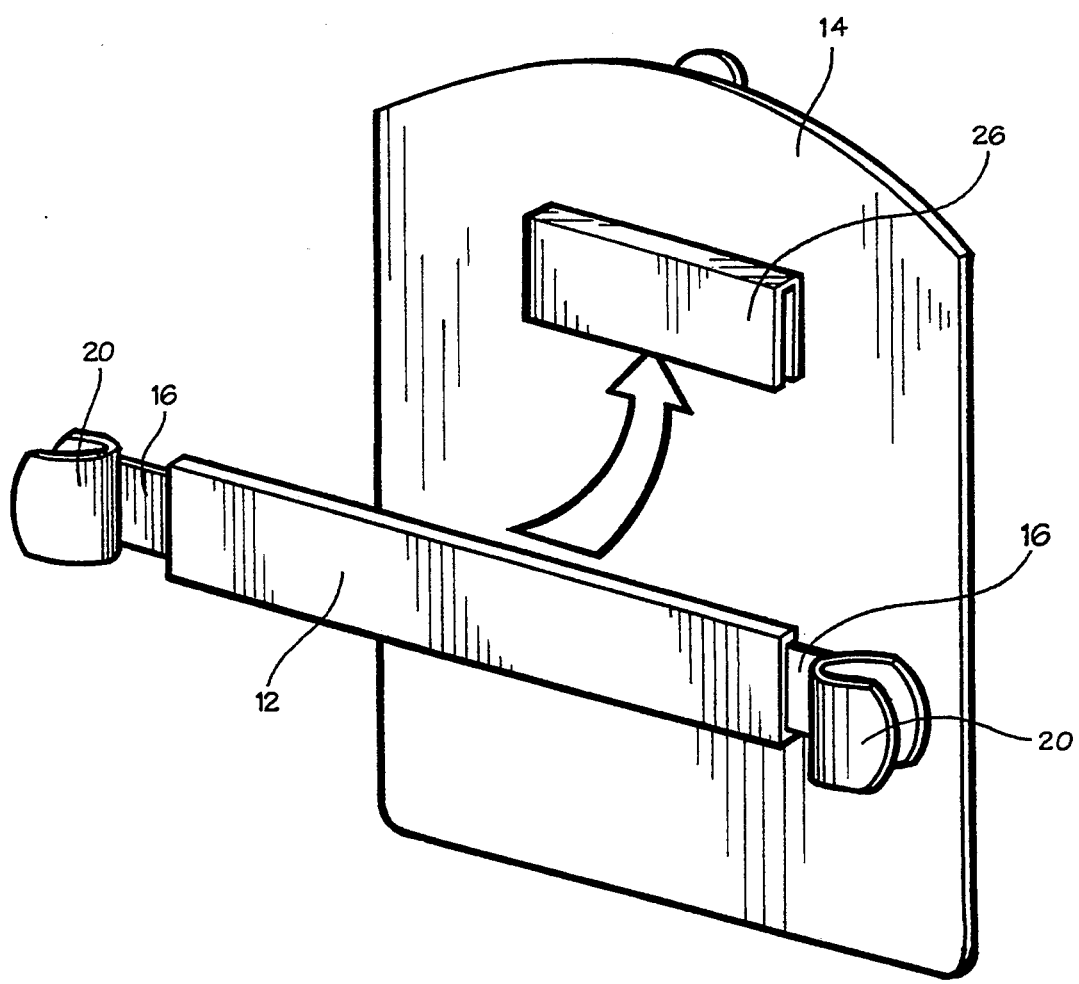
FIG. 6 is a perspective view of the back of the clipboard attachment of the preferred embodiment of FIG. 1, showing the housing detached from the clipboard with a slotted member attached to the clipboard and with the housing formed to provide means for receiving the slotted member for releasably securing the clipboard to the housing.
Figure 7:
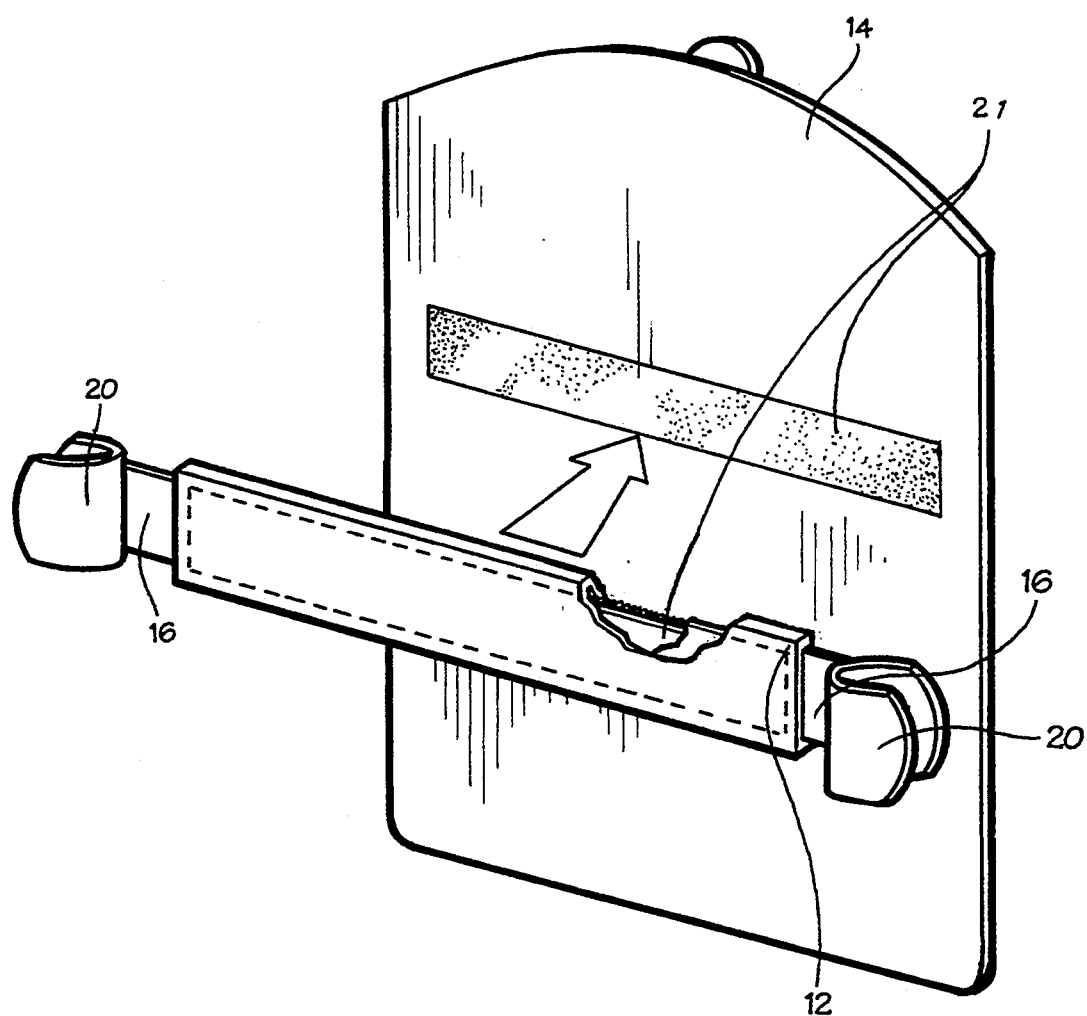
FIG. 7 is a perspective view of the back of the clipboard attachment of the preferred embodiment of FIG. 1, showing the housing detached from the clipboard and mating hook and loop fasteners for releasably securing the clipboard to the housing.

The clipboard 14 is releasably attached to the housing 12 preferably by means of mating hook and loop fasteners 21, as illustrated in FIG. 7. However, attachment may also preferably be effectuated by attaching a downwardly facing slotted member 26 on the clipboard 14 and forming the housing 12 as a bar for receiving and securing the slotted member 26, as illustrated in FIG. 6. The forming of the housing 12 may be dimensioned to provide a tight fit with the slotted member 26 in order to prevent dislodgement of the clipboard 14 from the steering wheel during manipulation of the steering wheel.

Figure 8:
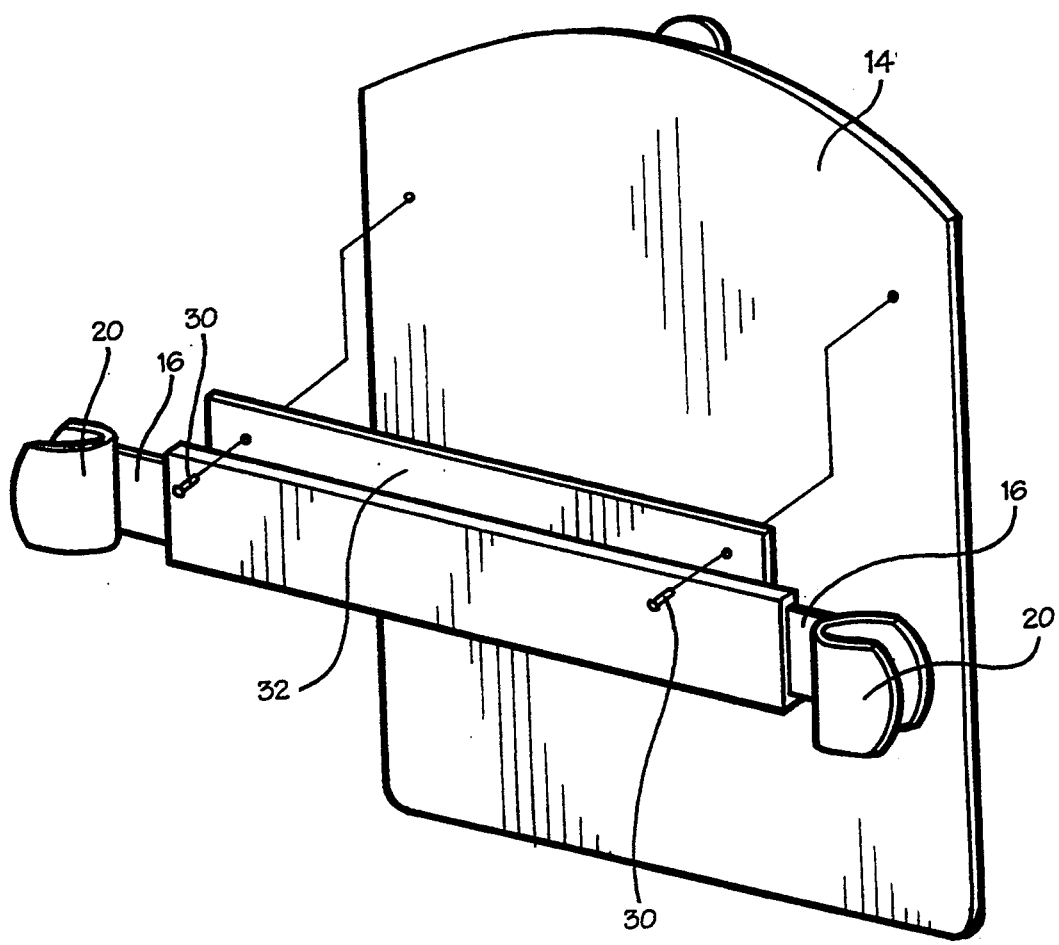
FIG. 8 is a perspective view of the back of the clipboard attachment of the preferred embodiment of FIG. 1, showing the housing attached to the clipboard by screws.

Alternatively, the housing 12 may be attached to the clipboard 14 by screws 30 extending through a flange 32 of the housing 12, and into the clipboard 14, as illustrated in FIG. 8.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and to the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A device attached to a steering wheel for supporting objects thereon, comprising:

a relatively rigid housing with opposite ends;

securing portions at opposite ends of said housing for attaching said housing to an inner rim of the steering wheel, said securing portions being telescoped within said housing; and means for engaging attachment of said securing portions to the inner rim of the steering wheel.

2. A device attached to a steering wheel for supporting objects thereon according to claim 1, wherein said engaging means includes spring biasing means within said housing for outwardly biasing said securing portions into attachment with the inner rim of the steering wheel.

3. A device attached to a steering wheel for supporting objects thereon according to claim 1, wherein said securing portions have outwardly facing U-shaped ends for receiving therein the inner rim of the steering wheel.

4. A device attached to a steering wheel for supporting objects thereon according to claim 1, wherein said engaging means comprises means releasably engageable with the outer rim of the steering wheel for releasably securing said securing portions to the inner rim of the steering wheel.

5. A device attached to a steering wheel for supporting objects thereon according to claim 4, wherein said releasably engageable means comprises a strip of flexible material secured to said securing portions and having one end releasably engageable with said securing portion by mating hook and loop fastener means.

6. A device attached to a steering wheel for supporting objects thereon according to claim 1, further comprising:
 a flat support member; and
 means for attaching said flat support member to said housing.

7. A device attached to a steering wheel for supporting objects thereon according to claim 6, wherein said attaching means comprises mating hook and loop fasteners on said housing and said flat support member.

8. A device attached to a steering wheel for supporting objects thereon according to claim 6, wherein said flat support member is disposed within the peripheral confines of the steering wheel.

9. A device attached to a steering wheel for supporting objects thereon according to claim 6, wherein said flat support member is a clipboard.

10. A device attached to a steering wheel for supporting objects thereon according to claim 6, wherein said attaching means comprises:
 a downwardly facing slotted member attached to said flat support member; and
 receiving means associated with said housing for receiving said slotted member for securing said flat support member to said housing.

11. A device attached to a steering wheel for supporting objects thereon according to claim 10, wherein said housing is formed to tightly fit within said slotted member of said clipboard.

12. A device attached to a steering wheel for supporting objects thereon, comprising:
 a relatively rigid housing with opposite ends;
 securing portions telescoped within said housing and disposed at opposite ends of said housing and having outwardly facing U-shaped ends for receiving therein an inner rim of the steering wheel to attach said housing to the inner rim of the steering wheel independent of the force of gravity;
 a spring biasing means within said housing for outwardly biasing said securing portions into attachment with the inner rim of the steering wheel;
 a strip of flexible material secured to each of said securing portions and having an end releasably engageable with said securing portion by mating hook and loop fastener means and being releasably engageable with an outer rim of the steering wheel for releasably securing said securing portions to the inner rim of the steering wheel;
 a clipboard; and
 means for attachment of said clipboard to said housing.

* * * * *